United States Patent
Yoshinaga et al.

(10) Patent No.: US 12,466,764 B2
(45) Date of Patent: Nov. 11, 2025

(54) LOW MELTING POINT TIN PHOSPHATE-BASED GLASS FRIT

(71) Applicants: YEJ GLASS CO., LTD., Kagoshima (JP); YEK GLASS CO., LTD., Gyeonggi-do (KR)

(72) Inventors: Hiroshi Yoshinaga, Kagoshima (JP); Yoshinari Takao, Kagoshima (JP)

(73) Assignees: YEJ Glass Co., Ltd., Kagoshima (JP); YEK Glass Co., Ltd., Gyeonggi-Do (KR)

( * ) Notice: Subject to any disclaimer, the term of this patent is extended or adjusted under 35 U.S.C. 154(b) by 878 days.

(21) Appl. No.: 17/673,385

(22) Filed: Feb. 16, 2022

(65) Prior Publication Data
US 2022/0169559 A1 Jun. 2, 2022

Related U.S. Application Data

(63) Continuation of application No. PCT/JP2020/009627, filed on Mar. 6, 2020.

(30) Foreign Application Priority Data

Oct. 15, 2019 (JP) ................. 2019-188405

(51) Int. Cl.
| | | |
|---|---|---|
| C03C 8/08 | (2006.01) | |
| C03C 3/066 | (2006.01) | |
| C03C 3/16 | (2006.01) | |
| C03C 3/19 | (2006.01) | |
| C03C 3/247 | (2006.01) | |

(52) U.S. Cl.
CPC ............... *C03C 8/08* (2013.01); *C03C 3/066* (2013.01); *C03C 3/16* (2013.01); *C03C 3/19* (2013.01); *C03C 3/247* (2013.01); *C03C 2205/00* (2013.01)

(58) Field of Classification Search
CPC .. C03C 8/08; C03C 8/06; C03C 12/00; C03C 3/16; C03C 3/19; C03C 3/247
See application file for complete search history.

(56) References Cited

U.S. PATENT DOCUMENTS

| | | | | |
|---|---|---|---|---|
| 6,309,989 | B1 * | 10/2001 | Kikutani | C03C 8/24 |
| | | | | 501/15 |
| 6,355,586 | B1 * | 3/2002 | Usui | C03C 8/24 |
| | | | | 501/15 |
| 2002/0128141 | A1 | 9/2002 | Buhrmaster et al. | |
| 2010/0252858 | A1 * | 10/2010 | Matsumoto | C03C 3/16 |
| | | | | 257/E33.059 |
| 2019/0010080 | A1 * | 1/2019 | Kohara | C03C 3/062 |

FOREIGN PATENT DOCUMENTS

| | | | | |
|---|---|---|---|---|
| JP | 2000169183 | A | 6/2000 | |
| JP | 2000219536 | A * | 8/2000 | ............... C03C 8/08 |
| JP | 2001048579 | A | 2/2001 | |
| JP | 2001139344 | A | 5/2001 | |
| JP | 2001302279 | A * | 10/2001 | ............... C03C 3/16 |
| JP | 2002255587 | A | 9/2002 | |
| JP | 2003183050 | A | 7/2003 | |
| JP | 2004010405 | A | 1/2004 | |
| JP | 2005097086 | A | 4/2005 | |
| JP | 2008037740 | A | 2/2008 | |
| JP | 2009256183 | A | 11/2009 | |
| JP | 2011178606 | A | 9/2011 | |
| JP | 2011225404 | A | 11/2011 | |
| JP | 2013193952 | A * | 9/2013 | ............. C03C 12/00 |
| WO | 2013141044 | A1 | 9/2013 | |
| WO | 2017119131 | A1 | 7/2017 | |

\* cited by examiner

*Primary Examiner* — Elizabeth A. Bolden
(74) *Attorney, Agent, or Firm* — Farber LLC

(57) ABSTRACT

A low melting point tin phosphate-based glass frit contains, in mol %, 15-75% of SnO, 0-40% of $SnF_2$, 10-50% of $P_2O_5$, 0-30% of ZnO, 0-5% of $Al_2O_3$, 0-30% of $B_2O_3$, 0-5% of $In_2O_3$, 0-5% of BaO, and 0-5% of $SiO_2$, does not contain Pb, and exhibits a temperature difference of 50° C. or less between the glass transition point to the glass softening point. The glass frit has a low softening point temperature and a conventional glass transition point temperature without using a substance that places a burden on the environment such as lead.

4 Claims, No Drawings

LOW MELTING POINT TIN PHOSPHATE-BASED GLASS FRIT

FIELD OF THE INVENTION

The present invention relates to a low melting point tin phosphate-based glass frit that can lower a glass softening point temperature while maintaining a conventional glass transition point temperature without using a substance that places a burden on the environment such as lead, etc.

BACKGROUND OF THE INVENTION

As conventional low melting point glass frits, for example, those described in Patent Literatures 1 to 5 are known. These inventions place emphasis on elimination of lead by adjustment of composition system (Patent Literatures 1 to 3) or improvement of weatherability (Patent Literatures 4 and 5).

CITATION LIST

Patent Literature

Patent Literature 1: Japanese Published Unexamined Patent Application No. 2000-169183
Patent Literature 2: Japanese Published Unexamined Patent Application No. 2001-48579
Patent Literature 3: Japanese Published Unexamined Patent Application No. 2004-010405
Patent Literature 4: Japanese Published Unexamined Patent Application No. 2008-037740
Patent Literature 5: Japanese Published Unexamined Patent Application No. 2011-225404

SUMMARY OF THE INVENTION

Technical Problem

Incidentally, although a main application of glass frits is electronic components such as displays, etc., such electronic components receive damage due to heat during sealing and it is preferable to perform work at a low temperature. However, with the above inventions, there is a problem in that a range from a glass transition point temperature to a firing temperature (working temperature) is approximately 100° C. or higher and thus a difference between the glass transition point temperature and the firing temperature (working temperature) is large and a sufficiently low melting property is not obtained.

It may thus be considered to lower the thermal characteristic of glass transition point to obtain a sufficiently low melting property. However, as described in Patent Literatures 1 and 4, there is a problem in that if the thermal characteristic of glass transition point is lowered, there is a tendency for weather resistance and water resistance to be lowered and thus a tendency for stability of glass to be lowered with lowering of the glass transition point temperature.

Although leaded glass can be cited as glass of low melting property and high stability, there is a problem in that this is high in environmental impact and is regulated.

Thus, in view of the foregoing circumstances, the present invention aims at providing a low melting point tin phosphate-based glass frit that can lower a glass softening point temperature while maintaining the conventional glass transition point temperature without using a substance that places a burden on the environment such as lead, etc.

Solution to Problem

The above object of the present invention is achieved by the following means.

That is, a low melting point tin phosphate-based glass frit according to the first aspect of the present invention contains, in mol %, 15 to 75% of SnO, 0 to 40% of $SnF_2$, 10 to 50% of $P_2O_5$, 0 to 30% of ZnO, 0 to 5% of $Al_2O_3$, 0 to 30% of $B_2O_3$, 0 to 5% of $In_2O_3$, 0 to 5% of BaO, and 0 to 5% of $SiO_2$.

The second aspect of the present invention is such that with the low melting point tin phosphate-based glass frit according to the first aspect, a temperature difference from a glass transition point to a glass softening point is 50° C. or less.

Further, the third aspect of the present invention is such that the low melting point tin phosphate-based glass frit according to the first or second aspect does not contain Pb.

Advantageous Effects of the Invention

The low melting point tin phosphate-based glass frit according to the first aspect of the present invention, due to containing SnO, $SnF_2$, $P_2O_5$, ZnO, $Al_2O_3$, $B_2O_3$, $In_2O_3$, BaO, and $SiO_2$ at specific proportions, can lower the glass softening point temperature while maintaining the conventional glass transition point temperature.

Further, according to the second aspect of the present invention, since the temperature difference from the glass transition point to the glass softening point is 50° C. or less, the glass softening point temperature can be lowered while maintaining the conventional glass transition point temperature.

Yet further, according to the third aspect of the present invention, the glass softening point temperature can be lowered while maintaining the conventional glass transition point temperature without containing Pb.

DETAILED DESCRIPTION OF THE INVENTION

The low melting point tin phosphate-based glass frit according to the present invention basically has a two-component system glass composition of $SnO—P_2O_5$ and may contain, in addition to the two essential components, $SnF_2$, ZnO, $Al_2O_3$, $B_2O_3$, $In_2O_3$, BaO, and $SiO_2$ as optional components, and, by the respective components being of specific proportions, can lower a glass softening point temperature while maintaining a conventional glass transition point temperature and specifically make a temperature difference from the glass transition point [Tg] to the glass softening point [Tf] be 50° C. or less.

That is, the glass composition of the present glass frit contains, in mol %, 15 to 75% of SnO, 0 to 40% of $SnF_2$, 10 to 50% of $P_2O_5$, 0 to 30% of ZnO, 0 to 5% of $Al_2O_3$, 0 to 30% of $B_2O_3$, 0 to 5% of $In_2O_3$, 0 to 5% of BaO, and 0 to 5% of $SiO_2$ and thereby, the temperature difference from the glass transition point [Tg] to the glass softening point [Tf] is made 50° C. or less.

In the above glass composition, if the proportion of SnO exceeds 75 mol %, glass cannot be formed sufficiently. Also, if the proportion of SnO is less than 15 mol %, although the glass is formed, a viscosity of melt increases, thereby making recovery from an alumina crucible, to be described below, difficult.

If the proportion of $P_2O_5$ exceeds 50 mol %, the viscosity of melt increases, thereby making recovery from the alumina crucible difficult. Also, if the proportion of $P_2O_5$ is less than 10 mol %, a component that forms a framework becomes insufficient and the glass cannot be formed sufficiently.

Although $SnF_2$ is a component that lowers the glass transition point, formation of the glass is impaired if it is present in excess of 40 mol %.

Although ZnO is a component that increases stability of glass, the glass is made opaque and impaired in transparency and hence decreased in stability if it is present in excess of 30 mol %.

Although $Al_2O_3$ is a component that increase the stability of glass, it causes poor melting and hence impairs the formation of the glass if it is present in excess of 5 mol %.

Although $B_2O_3$ is a component that decreases thermal expansivity and improves durability of the glass, the glass is made opaque and impaired in transparency and hence decreased in stability if it is present in excess of 30 mol %.

Although $In_2O_3$ is a component that improves the durability of the glass, vitrification is impaired and low temperature workability is degraded if it is present in excess of 5 mol %.

Although BaO is a component that acts as a network modifier oxide of the glass, it causes poor melting and hence impairs the formation of the glass if it is present in excess of 5 mol %.

Although $SiO_2$ is a component that acts as a network modifier oxide of the glass, it causes poor melting and hence degrades uniformity of the glass if it is present in excess of 5 mol %.

With the glass composition of the present glass frit, various other oxide components may be contained as necessary in addition to the abovementioned components. As such other oxide components, $ZrO_2$, CaO, MgO, etc., can be cited.

Thus, the glass composition of such a glass frit can lower the glass softening point temperature while maintaining the conventional glass transition point temperature without using a substance that places a burden on the environment such as Pb, etc.

EXAMPLES

The present invention shall now be described specifically by way of examples.

Manufacturing Examples 1 to 21

As glass raw materials, respective powders of SnO, $SnF_2$, $P_2O_5$, ZnO, $Al_2O_3$, $B_2O_3$, $In_2O_3$, BaO, and $SiO_2$ were weighed out and mixed such as to be of the proportions (mol %) indicated in Tables 1 and 2 below and placed in an alumina crucible of 50 cc volume. Also, a reducing agent was added as necessary in the process of weighing out. The alumina crucible was then left to stand inside a muffle furnace and melting by heating was performed at 800 to 1000° C. for 60 minutes or more in a nitrogen flowing state. Thereafter, the melt was poured into an alumina boat and recovered, and from the cooled glass bar, a glass rod of 4 mm square and 11 mm length was cut out and from the remaining portion, a glass frit pulverized to a particle size of 38 µm or less was manufactured.

Using the respective glass frits and glass rods manufactured by the above method, the thermal expansion coefficient [CTE], the glass transition point [Tg], the softening point [Tf], the firing temperature, and the color tone were examined. The results are shown in the Tables 1 and 2 below. The measurement methods of the respective items are as follows.

Thermal Expansion Coefficient

The thermal expansion coefficient was measured by a thermal mechanical analyzer (TMA8310, made by Rigaku Corporation). For the measurement, each of the abovementioned glass rods was used as the measurement sample, the temperature was increased from room temperature to 300° C. at a rate of 15° C./minute, and an average thermal expansion coefficient α was determined. Also, quartz glass was used as a standard sample.

Glass Transition Point and Softening Point

Using α-alumina as a reference (standard sample), the glass transition point [Tg] and the softening point [Tf] of each glass frit were measured by a differential thermal analyzer (TG-8120, made by Rigaku Corporation) under the measuring conditions of a heating rate of 15° C./minute and a temperature range of 25° C. (room temperature) to 300° C.

Color Tone and Firing Temperature

For the color tone, each glass bar retrieved in the alumina boat after melting was examined visually, and for the firing temperature, 0.55 g of a glass powder of each of the abovementioned glass frits was formed to a size of 10 mm diameter, fired for 20 minutes, and a temperature at which vitreous luster was exhibited was deemed to be the firing (working) temperature [Tw].

TABLE 1

| Glass frit No. | | 1 | 2 | 3 | 4 | 5 | 6 | 7 | 8 | 9 | 10 |
|---|---|---|---|---|---|---|---|---|---|---|---|
| Glass composition (mol %) | SnO | 51.6 | 48.1 | 66.6 | 53.6 | 42.0 | 45.5 | 44.7 | 46.4 | 68.1 | 69.1 |
| | $SnF_2$ | | 14.2 | | 17.8 | | | | 25.0 | | |
| | $P_2O_5$ | 33.2 | 26.8 | 29.1 | 25.9 | 42.1 | 19.9 | 19.5 | 25.9 | 29.7 | 30.9 |
| | ZnO | 9.2 | 8.3 | 3.3 | 2.7 | 10.0 | 10.6 | 14.0 | 2.7 | | |
| | $Al_2O_3$ | 2.5 | 2.6 | 0.6 | | 2.6 | 0.5 | 0.4 | | 0.7 | |
| | $B_2O_3$ | 3.0 | | 0.2 | | 3.3 | 21.2 | 18.1 | | 1.3 | |
| | $In_2O_3$ | 0.5 | | 0.2 | | | 0.1 | 0.1 | | 0.2 | |
| | BaO | | | | | | 2.4 | 1.2 | | | |
| | $SiO_2$ | | | | | | | 2.0 | | | |

TABLE 1-continued

| Glass frit No. | | 1 | 2 | 3 | 4 | 5 | 6 | 7 | 8 | 9 | 10 |
|---|---|---|---|---|---|---|---|---|---|---|---|
| Characteristics | Glass transition point [Tg] (° C.) | 340 | 281 | 289 | 253 | 337 | 405 | 385 | 251 | 301 | 286 |
| | Glass softening point [Tf] (° C.) | 374 | 301 | 312 | 267 | 364 | 427 | 412 | 269 | 328 | 306 |
| | Thermal expansion coefficient [CTE] ($\times 10^{-7}/°$ C.) | 86 | 116 | 113 | 110 | 95 | 91 | 83 | 113 | 111 | 123 |
| | Working temperature [Tw] (° C.) | 420 | 340 | 340 | 300 | 420 | 470 | 450 | 300 | 350 | 340 |
| | Tw − Tg (° C.) | 80 | 59 | 51 | 47 | 83 | 65 | 65 | 49 | 49 | 54 |
| | Color tone | Colorless and transparent | Colorless and transparent | Colorless and transparent | Colorless and transparent | Colorless and transparent | Colorless and transparent | Colorless and transparent | Colorless and transparent | Colorless and transparent | Colorless and transparent |

The results of Table 1 show that, with the glass frits obtained in Manufacturing Examples 1 to 10, the temperature difference from the glass transition point [Tg] to the glass softening point [Tf] is 50° C. or less because the proportions of the respective components of SnO, SnF$_2$, P$_2$O$_5$, ZnO, Al$_2$O$_3$, B$_2$O$_3$, In$_2$O$_3$, BaO, and SiO$_2$ are within the prescribed ranges of the present invention. Also, the temperature difference between the glass transition point [Tg] and the working temperature [Tw] is below 100° C. and sufficient low melting property is obtained.

In regard to the results of Table 2, with a glass composition where, as in the glass frit obtained in Manufacturing Example 11, the proportion of SnO is made higher than that prescribed by the present invention, solidification to a ceramic state occurred inside the alumina crucible and thus a melt could not be poured into the alumina boat and be recovered. Measurement of the glass characteristics was thus impossible.

Also, with a glass composition where, as in the glass frit obtained in Manufacturing Example 12, the proportion of

TABLE 2

| Glass frit No. | | 11 | 12 | 13 | 14 | 15 | 16 | 17 | 18 | 19 | 20 | 21 |
|---|---|---|---|---|---|---|---|---|---|---|---|---|
| Glass composition (mol %) | SnO | 80.0 | 61.4 | 61.0 | 58.8 | 40.0 | 25.0 | 9.6 | 31.7 | 31.9 | 22.6 | 61.9 |
| | SnF$_2$ | | | | | | 50.0 | 48.2 | | | | |
| | P$_2$O$_5$ | 20.0 | 26.9 | 26.7 | 9.8 | 60.0 | 20.0 | 30.1 | 25.3 | 20.2 | 45.2 | 27 |
| | ZnO | | 3.1 | 3.0 | 24.5 | | 3.0 | 12.1 | 38.0 | 13.9 | 15.5 | 3.1 |
| | Al$_2$O$_3$ | | 0.6 | 8.9 | 2.0 | | 2.0 | | 2.5 | 2.1 | 1.2 | 0.6 |
| | B$_2$O$_3$ | | 0.2 | 0.2 | 4.9 | | | | 2.5 | 31.9 | 6.0 | 0.2 |
| | In$_2$O$_3$ | | 0.2 | 0.2 | | | | | | | 9.5 | 0.2 |
| | BaO | | | | | | | | | | | 7.0 |
| | SiO$_2$ | | 7.6 | | | | | | | | | |
| Characteristics | Glass transition point [Tg] (° C.) | Un-recoverable | Un-recoverable | Un-recoverable | Un-recoverable | Un-recoverable | Un-recoverable | Un-recoverable | 356.3 | 374.1 | Un-recoverable | Un-recoverable |
| | Glass softening point [Tf] (° C.) | | | | | | | | 415 | 402.1 | | |
| | Thermal expansion coefficient [CTE] ($\times 10^{-7}/°$ C.) | | | | | | | | — | — | | |
| | Working temperature [Tw] (° C.) | | | | | | | | — | — | | |
| | Tw − Tg (° C.) | | | | | | | | — | — | | |
| | Color tone | | | | | | | | Opaque | Opaque Partially unmelted | | |

SiO$_2$ is made higher than that prescribed by the present invention, a portion of the melt solidified inside the alumina crucible and this became mixed with the melt, thereby preventing recovery of a sufficient amount of the melt. Measurement of the glass characteristics was thus impossible.

Further, with a glass composition where, as in the glass frit obtained in Manufacturing Example 13, the proportion of Al$_2$O$_3$ is made higher than that prescribed by the present invention, solidification to a ceramic state occurred inside the alumina crucible and thus a melt could not be poured into the alumina boat and be recovered. Measurement of the glass characteristics was thus impossible.

Yet further, with a glass composition where, as in the glass frit obtained in Manufacturing Example 14, the proportion of P$_2$O$_5$ is made lower than that prescribed by the present invention, solidification as a ceramic occurred inside the alumina crucible and thus a melt could not be poured into the alumina boat and be recovered, and with a glass composition where, as in the glass frit obtained in Manufacturing Example 15, the proportion of P$_2$O$_5$ is made higher than that prescribed by the present invention, the melt became too high in viscosity and a sufficient amount thereof could not be recovered in the alumina boat. Measurement of the glass characteristics was thus impossible.

On the other hand, with a glass composition where, as in the glass frit obtained in Manufacturing Example 16, the proportion of SnF$_2$ is made higher than that prescribed by the present invention, solidification to a ceramic state occurred inside the alumina crucible and thus a melt could not be poured into the alumina boat and be recovered. Measurement of the glass characteristics was thus impossible.

Also, on the other hand, with a glass composition where, as in the glass frit obtained in Manufacturing Example 17, the proportion of SnO is made lower than that prescribed by the present invention and the proportion of SnF$_2$ is made higher than that prescribed by the present invention, the melt became high in viscosity and a sufficient amount thereof could not be recovered in the alumina boat. Measurement of the glass characteristics was thus impossible.

Meanwhile, with a glass composition where, as in the glass frit obtained in Manufacturing Example 18, the proportion of ZnO is made higher than that prescribed by the present invention, the temperature difference from the glass transition point [Tg] to the glass softening point [Tf] is not 50° C. or less and further, since the glass contains crystal matter inside and is opaque, it was judged to be of poor quality and other measurements were omitted.

Also, with a glass composition where, as in the glass frit obtained in Manufacturing Example 19, the proportion of B$_2$O$_3$ is made higher than that prescribed by the present invention, although the temperature difference from the glass transition point [Tg] to the glass softening point [Tf] is 50° C. or less, since the glass has a portion of the raw material remaining inside, is opaque, and is partially unmelted, it was judged to be of poor quality and other measurements were omitted.

On the other hand, with a glass composition where, as in the glass frit obtained in Manufacturing Example 20, the proportion of In$_2$O$_3$ is made higher than that prescribed by the present invention, solidification to a ceramic state occurred inside the alumina crucible and thus a melt could not be poured into the alumina boat and be recovered. Measurement of the glass characteristics was thus impossible.

Also, with a glass composition where, as in the glass frit obtained in Manufacturing Example 21, the proportion of BaO is made higher than that prescribed by the present invention, solidification to a ceramic state occurred inside the alumina crucible and thus a melt could not be poured into the alumina boat and be recovered. Measurement of the glass characteristics was thus impossible.

It was thus made clear from Manufacturing Examples 1 to 21 that by the glass composition of the glass frit being such that the proportions of the respective components of SnO, SnF$_2$, P$_2$O$_5$, ZnO, Al$_2$O$_3$, B$_2$O$_3$, In$_2$O$_3$, BaO, and SiO$_2$ are within the prescribed ranges of the present invention, the temperature difference from the glass transition point [Tg] to the glass softening point [Tf] is made 50° C. or less. Furthermore, it was made clear that the glass softening point temperature can be lowered without using a substance that places a burden on the environment such as Pb, etc., and while maintaining the conventional glass transition point temperature.

What is claimed is:

1. A low melting point tin phosphate-based glass frit comprising, in mol %, 44.7 to 75% of SnO, 0 to 40% of SnF$_2$, 10 to 50% of P$_2$O$_5$, 0 to 30% of ZnO, 0 to 5% of Al$_2$O$_3$, 0 to 30% of B$_2$O$_3$, 0.1 to 5% of In$_2$O$_3$, 1.2 to 5% of BaO, and 0 to 5% of SiO$_2$.

2. The low melting point tin phosphate-based glass frit according to claim 1, wherein a temperature difference from a glass transition point to a glass softening point is 50° C. or less.

3. The low melting point tin phosphate-based glass frit according to claim 1 that does not contain Pb.

4. The low melting point tin phosphate-based glass frit according to claim 2 that does not contain Pb.

* * * * *